Jan. 5, 1937.  R. J. G. CROUCH ET AL  2,066,336
AIRCRAFT
Filed Oct. 5, 1933   2 Sheets-Sheet 2
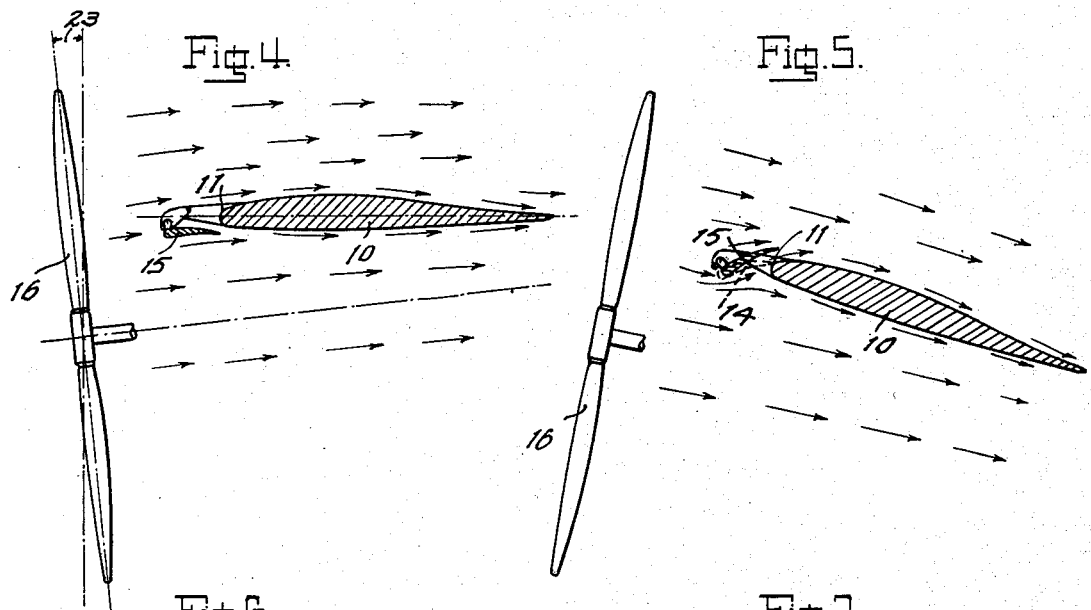
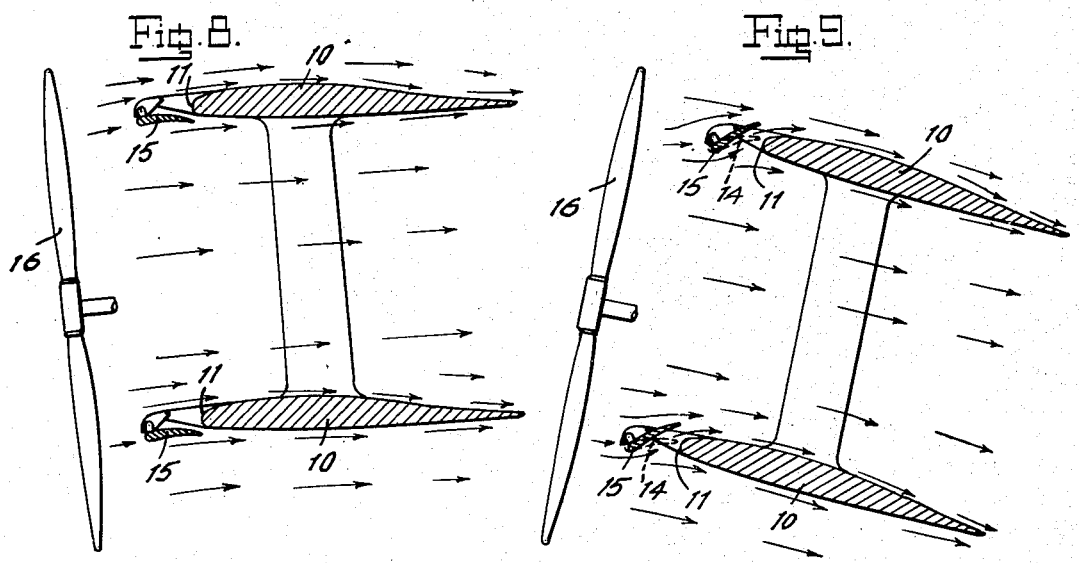
INVENTORS
R. J. Goodman Crouch
and Harold Bolas
BY
ATTORNEY Patented Jan. 5, 1937

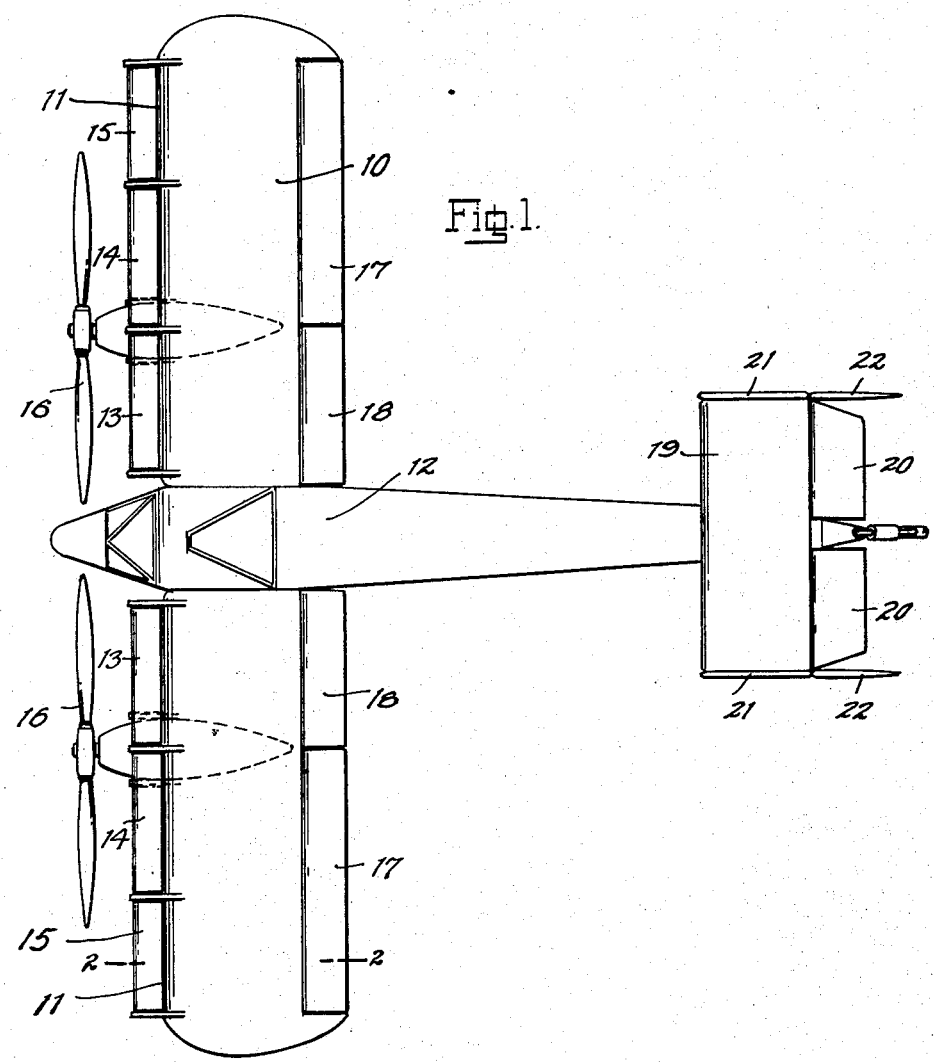
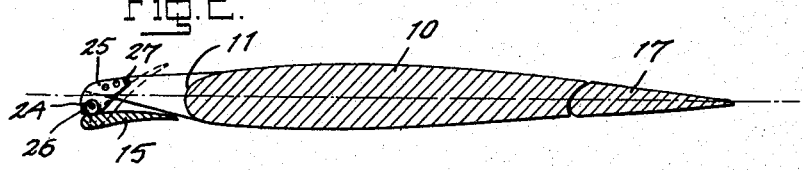
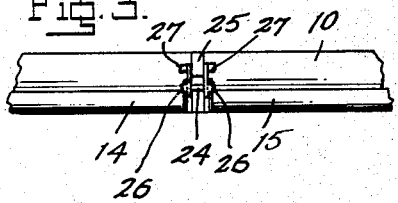

2,066,336

UNITED STATES PATENT OFFICE 2,066,336

AIRCRAFT

Rupert John Goodman Crouch and Harold Bolas, Pawtucket, R. I.

Application October 5, 1933, Serial No. 692,241

3 Claims. (Cl. 244—14)

The present invention relates to improvements in aircraft, and particularly to wings or supporting planes used in combination with an engine driven propeller or air-screw so disposed that a major portion of the wing surface is substantially immersed in the propeller slip stream.

It is known that the angle of incidence at which break-down of the steady flow of air over the upper surface of a wing or supporting plane occurs may be increased—with a consequent increase of lift for a given air speed—by the provision of a suitably shaped rearwardly inclined passage or slot through which air can flow from the under surface to the upper surface of the wing.

It is also known that a wing with such a passage may be formed by the combination of a relatively small auxiliary airfoil of wing section arranged with its trailing edge above the leading edge of the main supporting plane or planes, operated either automatically by the impinging air stream itself, or by controls available to the pilot. Many forms of producing this slot exist, including the auxiliary pilot plane swinging within prescribed limits in the impinging air stream, and the slotted construction now commonly known as the Handley-Page slotted wing, which has its opening on the under surface of the main aerofoil, adjacent to the nose, extending in a curved direction rearwards, and having its exit on the upper surface of said aerofoil at a short distance rearward of the entrance in the under surface, with means for controlling the aperture and width of the slot, either automatically or by the pilot.

It is further known, that in a normal airplane, the slip stream of the propeller or propellers intercepts a portion or portions of the wings or supporting surfaces. This slip stream has a definite effect on the wing surface immersed in it, being in sufficient amount to produce a measurable decrease in stalling speed when the propeller is running.

The present invention has for its main object the obtaining in combination, of the advantages of the slot either as generated by an auxiliary pilot aerofoil, or in the form now commonly known as the Handley Page slotted wing, or any of the other well known forms of the device, and the maximum use of the propeller thrust and slip stream to produce lift of the order of full airplane weight, with little or no forward movement through the air. Hereinafter, the various methods of producing this slot will be understood to be included under the terms as "pilot vane" or "pilot wing" or "auxiliary pilot aerofoil."

It is proposed in the present invention to provide a wing of any desirable aerofoil section with a pilot plane of wing section, mounted in position in front of and below the leading edge of the main supporting surface, and statically balanced with its chord in normal flight free to adapt itself, when the main supporting surface is at small angles of incidence, to positions of minimum drag and interference.

It is further proposed to provide a propeller, or multiplicity of propeller units driven by any suitable means, substantially immersing a major portion of the pilot plane and main supporting surface in its slip stream and placed at such a distance from and in such vertical relation to the main supporting surface as to provide for maximum slip stream velocity at the leading edge of such supporting surface, and set with its axis at such an angle to the chord of said main supporting surface that when said axis is horizontally disposed the said main supporting surface always presents a positive angle of incidence to the horizon. Hereinafter, throughout this specification, reference to "positive angle of incidence" will indicate this relation.

It is further proposed to provide a plurality of independently movable pilot planes or sections, certain of said pilot planes or sections being immersed in the propeller slip stream, while others are not so immersed, in order to take maximum advantage of the additional lift supplied at high angles of incidence by said propeller slip stream.

Provision is additionally made for reasons which will hereinafter appear, to divide the pilot planes or sections immersed in the propeller slip stream in the vertical plane of the propeller axis.

With the above and other objects in view embodiments of the invention as existing in the combination shown in the accompanying drawings will be hereinafter more fully described with reference thereto, and the invention will be finally pointed out in the claims.

In the drawings:—

Fig. 1 is a plan view of an aircraft, according to an exemplary embodiment of our invention.

Fig. 2 is an enlarged sectional view of the wing structure, taken along the line 2—2 of Fig. 1.

Fig. 3 is a fragmentary view in front elevation of the leading edge of the wing.

Fig. 4 is a diagrammatic view showing the wing and propeller of a monoplane aircraft according to our invention, the wing being at a small angle of incidence.

Fig. 5 is a similar view showing the wing at a high angle of incidence.

Fig. 6 is a diagram of the parallelogram of forces due to the air stream produced by forward speed and the slip stream of the propellers acting on the wing under the conditions illustrated in Fig. 4.

Fig. 7 is a parallelogram of forces under the conditions illustrated in Fig. 5.

Fig. 8 is a view similar to Fig. 1 but illustrating the invention as embodied in a bi-plane structure, the same being shown at a small angle of incidence.

Fig. 9 is a similar view showing the bi-plane structure at a high angle of incidence.

Similar reference characters indicate corresponding parts throughout the several figures of the drawings.

Referring to the drawings, a main supporting surface or wing 10 is provided at its leading edge 11 and at each side of the fuselage 12 with auxiliary pilot vanes 13, 14 and 15, of which two on each side, 13 and 14, are immersed in the slip stream from the propellers 16, the division between these pilot vanes 13 and 14 being in the vertical plane of the propeller axis, while one pilot vane, the outer end vane 15, is not so immersed.

Ailerons 17—17 are provided at the trailing edge of the wing and between these and the fuselage are arranged flaps 18—18, the ailerons and flaps being preferably controllable by any well known means to move together and in the same direction in order to vary the aerodynamic characteristics of the wing when desired, and the ailerons being also operable independently of the flaps to move in opposite directions and act as ailerons for lateral control. At the tail end of the fuselage there are provided the tail control surfaces comprising a stabilizer 19, elevators 20—20, fins 21—21 and rudders 22—22, these being preferably so disposed as to lie in the path of the slip stream from the propellers.

The propellers 16 are mounted in front of and at a positive angle of incidence 23 (Fig. 4) to said main supporting surface. The fore and aft and vertical relation of the propellers 16 to the main supporting surface 10 is arranged to enable the slip stream generated by the propellers to accelerate to maximum value by the time the leading edge of the main supporting surface is reached. We have determined, from theoretical and experimental conditions of static thrust, that the velocity of the slip stream expressed as a function of distance along the propeller blade, from the axis outwards to the tip is at zero at a point 10% of the length of the propeller blade out from the hub, and again at a point approximately 5% in towards the hub from the blade tip, in the intermediate region, increasing in a smooth curve outwards from the hub to reach a maximum at a point approximately 62% out from the hub, thereafter decreasing again to zero near the blade tip. For the region from 35% to 70% of the length of the blade measured outwards from the propeller hub, the slip stream velocity is approximately of the order of maximum velocity and may be so considered for practical purposes.

The pilot vanes 13, 14 and 15 are statically balanced about pivots 24 provided at the ends of supports 25, which are preferably in the form of forwardly projecting elongations of the main ribs of the wing, the axis of the pivots 24 being outside and above the pilot vanes, but below the plane of the main chord of the wing, indicated by the dot and dash line, Fig. 2. The static balance of the pilot vanes is obtained by the disposition of their weight in relation to the pivot supports 24. The pilot vanes are entirely independent of each other in their action and are limited in their movement solely by stops 26 and 27, which are provided in the positions for the pilot vanes near minimum drag at small angles of incidence, and at maximum effect in increasing stalling angle at high angles of incidence, the pilot vanes being operated within the limits set by the stops solely by the differential air flow over each vane.

Fig. 4 shows the position of the vanes with the main supporting surface at small angle of incidence as in normal high speed flight. In normal flight, at small angles of incidence, and consequent high air speed, the effect of the superimposed slip stream, while at a positive angle of incidence and furnishing some positive lift, is insignificant, and the various immersed and unimmersed pilot vanes are substantially parallel in a position of minimum drag.

As the air speed decreases, and consequently the angle of incidence of the main supporting plane becomes greater, as shown for instance in Fig. 5, the propeller slip stream effect increases, supply (in part) for the portion of main supporting surface and pilot vane immersed therein the deficiency in air flow due to the decrease in forward speed.

Under these conditions the pilot vane immersed in the slip stream will be acted upon by a stream of air whose direction and velocity will be the resultant of two components, one the air flow, due to forward speed, the other that due to the propeller slip stream at a fixed positive angle of incidence to the main supporting surface. As the angle of incidence of the main supporting plane becomes greater, and simultaneously as the air speed falls off, the component of air flow on the main supporting surface and pilot vanes immersed in the propeller slip stream will first be greater in velocity, and less in angle of incidence, than that component due to the propeller slip stream, then passing through the point where its angle of incidence to the main supporting surface is identical with that of the propeller slip stream, will reach a region where its angle of incidence will be greater and its velocity generally less, than that component due to said propeller slip stream.

At high angles of incidence therefore, the portion of the main supporting surface and pilot vanes emmersed in the propeller slip stream will react to an airflow appreciably less in angle of incidence than that affecting the portion of main supporting surface and pilot vanes not so immersed. Under these conditions, the trailing edge of pilot vane sections immersed in the slip stream will tend to rise more slowly, as shown in dotted lines in Fig. 5, than the trailing edges of the vanes not so immersed, and as shown in full lines. By this means, the stalling angle to the horizon at which the main supporting surface can fly, will obviously be greatly increased, the increase in general being of such an order that the weight of the aircraft can be supported at little or no forward speed.

The diagrams of parallelograms, Figs. 6 and 7, show the forces due to the two air streams acting on the main supporting surface under the conditions illustrated in Figs. 4 and 5.

In these diagrams:—

A=vector acting on the main supporting surface 10 due to velocity and direction of normal flight.

B = vector acting on main supporting surface 10 due to velocity and direction of superimposed propeller slip stream.
C = vector resultant on main wing 10.
(N. B. in Fig. 6 the vector lengths are not approximately to scale, B being magnified in relation to A about ten times. In Fig. 7 the vector lengths are approximately to scale.)

The division of the pilot plane sections immersed in the air stream in the vertical plane of the propeller axis, makes possible the further desirable refinement, that provision is made for the difference in direction of the two sides of the propeller slip stream, as divided by the vertical plane through the propeller axis, due to the rotation of the propeller. It will be obvious that the slip stream generated by the blades rising on one side will be appreciably different in direction from that generated by the blades on the descending side. This difference in direction is of an order definitely altering the angle of incidence of the propeller slip stream impinging on the main supporting surface. The provision of an independently moving pilot vane for each side of the slip stream, by the automatic action of the vane in taking up a position of minimum drag within its range makes allowance for the divergence of the two halves of the slip stream and, when in their upper limiting position, bring said halves back into practical equilibrium before they are allowed to impinge on the main supporting surface.

The provision of a plurality of pilot vanes forming sections immersed and not immersed in the slip stream, and the subdivision of the immersed vanes in order to make provision for the swirl in the slip stream due to the rotation of the propeller, are additionally desirable from the point of view of design, eliminating, as they do, torque effects in the pilot vane itself due to the different conditions of aerodynamic equilibrium, obtaining throughout the length of the pilot vane considered as a whole, in those intermediate positions between minimum and maximum positions of the pilot vane.

It will be obvious that the effectiveness of this invention, is independent of the number of wings or position thereof in use, it being necessary only to have a major portion of the main supporting surfaces, with their auxiliary pilot vanes, substantially immersed in the propeller slip stream. Figs. 4 and 5, for example, illustrate the invention as embodied in a monoplane type aircraft, and Figs. 8 and 9 show it embodied in a bi-plane type.

As shown in Fig. 1 the engines for driving the propellers are mounted upon the upper side of the lower wing between the inner and intermediate vanes.

We have illustrated and described preferred and satisfactory embodiments of our invention, but it will be obvious that changes may be made therein, within the spirit and scope thereof, as defined in the appended claims.

Having thus described our invention what we claim and desire to secure by Letters Patent is:—

1. In an aircraft, a main supporting surface, auxiliary pilot aerofoil means, and propeller means adapted to produce a slip stream substantially immersing a portion of said main supporting surface, said auxiliary aerofoil means comprising a plurality of sections disposed longitudinally of the span of said main supporting surface certain of said sections being fully immersed in said slip stream and arranged for independent movement at each side of the propeller axis whereby they move independently and respectively in the upward and downward swirl produced in the slip stream by the rotation of said propeller, others of said sections being substantially free of said stream, and stop means adapted to limit said sections to a position of maximum effect.

2. In an aircraft, a fuselage, a wing at one side of the fuselage, at least one air-screw mounted to one side of the fuselage and forwardly of the wing having its axis at such angle to the chord of the wing that when said air-screw axis is horizontally disposed the chord of the wing presents a positive angle of incidence to the horizon and arranged to develop a slip stream enveloping a portion of said wing, a plurality of pivotally supported auxiliary pilot aerofoils disposed longitudinally of the span of said wing at its leading edge and each independently movable, at least one of said auxiliary pilot aerofoils being at one side of the air-screw axis and immersed in the air-screw slip stream, and at least one of said auxiliary pilot aerofoils being at the other side of the air-screw axis and immersed in the air-screw slip stream, said auxiliary pilot aerofoils being statically balanced through disposition of their weight in relation to their pivotal supports and their trailing edges being free to pass above or below the leading edge of said wing, and stop means adapted to limit said auxiliary pilot aerofoils to a position of maximum effect.

3. In an aircraft, a fuselage, a wing at one side of the fuselage, at least one air-screw mounted to one side of the fuselage and forwardly of the wing and arranged to develop a slip stream enveloping a portion of said wing, a plurality of pivotally supported auxiliary pilot aerofoils disposed longitudinally of the span of said wing at its leading edge and each independently movable, at least one of said auxiliary pilot aerofoils being at one side of the air-screw axis and immersed in the air-screw slip stream, and at least one of said auxiliary pilot aerofoils being at the other side of the air-screw axis and immersed in the air-screw slip stream, said auxiliary pilot aerofoils being statically balanced through disposition of their weight in relation to their pivotal supports and their trailing edges being free to pass above or below the leading edge of said wing, and stop means adapted to limit said auxiliary pilot aerofoils to a position of maximum effect.

RUPERT JOHN GOODMAN CROUCH.
HAROLD BOLAS.